United States Patent
Tucker et al.

(10) Patent No.: US 11,782,882 B2
(45) Date of Patent: Oct. 10, 2023

(54) METHODS FOR AUTOMATED ARTIFACT STORAGE MANAGEMENT AND DEVICES THEREOF

(71) Applicant: JPMorgan Chase Bank, N.A., New York, NY (US)

(72) Inventors: Michael A. Tucker, Newark, OH (US); Rajesh Madamanchi, New Albany, OH (US); V. R. Thykkutathil, Columbus, OH (US); Suryanarayan Suhas Talak, Powell, OH (US); Carey D. Hutchins, Mount Gilead, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 504 days.

(21) Appl. No.: 15/877,054

(22) Filed: Jan. 22, 2018

(65) Prior Publication Data

US 2019/0228078 A1    Jul. 25, 2019

(51) Int. Cl.
| | |
|---|---|
| G06F 16/20 | (2019.01) |
| G06F 16/182 | (2019.01) |
| G06F 9/54 | (2006.01) |
| G06F 3/06 | (2006.01) |
| H04L 67/1097 | (2022.01) |
| G06F 16/14 | (2019.01) |
| G06F 16/11 | (2019.01) |
| G06F 16/185 | (2019.01) |

(52) U.S. Cl.
CPC ........ *G06F 16/1827* (2019.01); *G06F 3/0614* (2013.01); *G06F 9/547* (2013.01); *G06F 16/122* (2019.01); *G06F 16/14* (2019.01); *G06F 16/185* (2019.01); *H04L 67/1097* (2013.01)

(58) Field of Classification Search
None
See application file for complete search history.

(56) References Cited

U.S. PATENT DOCUMENTS

| | | |
|---|---|---|
| 6,330,572 B1 | 12/2001 | Sitka |
| 6,393,415 B1 * | 5/2002 | Getchius ................ G06Q 30/00 |

(Continued)

OTHER PUBLICATIONS

International Search Report for International Application No. PCT/US19/14236, dated Apr. 15, 2019.

*Primary Examiner* — Jau Shya Meng
(74) *Attorney, Agent, or Firm* — Greenblum & Bernstein, P.L.C.

(57) ABSTRACT

Methods, non-transitory computer readable media, and storage management devices that ingest artifacts from applications. The artifacts are stored on storage tiers using storage providers each configured to interface with one of the storage tiers. Metadata for each of the artifacts is generated and stored in a metadata store. The metadata includes a unique identifier for each of the artifacts associated with a storage location for each of the artifacts on the storage tiers. Configurable expressions of a storage policy are periodically and automatically applied to the metadata to determine when one or more of the artifacts should be migrated. The one or more of the artifacts are migrated from a first storage tier to a second storage tier using first and second storage providers configured to interface with the first and second storage tiers, respectively, when the determination indicates that the one or more of the artifacts should be migrated.

12 Claims, 5 Drawing Sheets

(56) References Cited

U.S. PATENT DOCUMENTS

| | | | |
|---|---|---|---|
| 8,880,835 B2 | 11/2014 | Benhase et al. | |
| 9,665,288 B1* | 5/2017 | Aharoni | G06F 3/0649 |
| 2007/0179995 A1* | 8/2007 | Prahlad | G06F 11/1451 |
| 2009/0138480 A1 | 5/2009 | Chatley et al. | |
| 2010/0250549 A1* | 9/2010 | Muller | G06F 16/27 707/769 |
| 2011/0055293 A1* | 3/2011 | Tevis | G06F 16/256 707/812 |
| 2011/0060916 A1* | 3/2011 | Faitelson | G06F 16/13 713/189 |
| 2011/0258405 A1* | 10/2011 | Asaki | G06F 3/061 711/170 |
| 2012/0101995 A1* | 4/2012 | Agetsuma | G06F 3/0605 707/644 |
| 2013/0159648 A1* | 6/2013 | Anglin | G06F 11/1453 711/162 |
| 2013/0339298 A1* | 12/2013 | Muller | G06F 11/1415 707/640 |
| 2014/0006465 A1* | 1/2014 | Davis | G06F 16/183 707/827 |
| 2014/0136654 A1* | 5/2014 | Marar | H04L 67/10 709/217 |
| 2015/0205674 A1* | 7/2015 | Schroth | G06F 11/1458 707/649 |
| 2015/0293699 A1* | 10/2015 | Bromley | G06F 16/1827 711/161 |
| 2015/0319244 A1* | 11/2015 | Resch | G06F 9/526 714/766 |
| 2015/0379060 A1* | 12/2015 | Levandoski | G06F 16/2322 707/607 |
| 2016/0132433 A1* | 5/2016 | Hayashi | G06F 3/067 711/118 |
| 2017/0185304 A1* | 6/2017 | Curtis-Maury | G06F 3/0605 |

* cited by examiner

METHODS FOR AUTOMATED ARTIFACT STORAGE MANAGEMENT AND DEVICES THEREOF

FIELD

This technology generally relates to data storage networks and, more particularly, to methods and devices for automated artifact storage management in data storage networks.

BACKGROUND

As enterprise networks increase in scale, a relatively large number of applications may be managing artifacts, such as images and documents. Each application generally has to be aware of the state and location of particular artifacts on back-end storage devices, and has to manage varying durability and retention requirements across different end user or customer types. Currently, there are compliance failures with respect to artifact lifecycles in many enterprise data storage networks, resulting in institutional risk.

Moreover, many enterprise storage platforms are inefficient and costly due to artifact duplication, management of many storage endpoints, maintenance of artifacts longer than required by retention policies, or maintenance of artifacts in more costly and/or higher performance storage than required based on customer requirements or service level objectives or agreements. System performance may also be reduced due to inefficiencies and overhead required to manage artifacts and associated lifecycles, particularly in relatively large enterprise networks.

SUMMARY

A method for automated artifact storage management, implemented by one or more storage management devices, includes ingesting a plurality of artifacts from one or more applications. The artifacts are stored on a plurality of storage tiers using a plurality of storage providers each configured to interface with one of the storage tiers. Metadata for each of the artifacts is generated and stored in a metadata store. The metadata includes at least a unique identifier for each of the artifacts associated with a storage location for each of the artifacts on the storage tiers. One or more configurable expressions of a storage policy are periodically and automatically applied to the metadata to determine when one or more of the artifacts should be migrated. The one or more of the artifacts are migrated from a first one of the storage tiers to a second one of the storage tiers using first and second ones of the storage providers configured to interface with the first and second ones of the storage tiers, respectively, when the determination indicates that the one or more of the artifacts should be migrated.

A storage management device includes memory comprising programmed instructions stored thereon and one or more processors configured to be capable of executing the stored programmed instructions to ingest a plurality of artifacts from one or more applications. The artifacts are stored on a plurality of storage tiers using a plurality of storage providers each configured to interface with one of the storage tiers. Metadata for each of the artifacts is generated and stored in a metadata store. The metadata includes at least a unique identifier for each of the artifacts associated with a storage location for each of the artifacts on the storage tiers. One or more configurable expressions of a storage policy are periodically and automatically applied to the metadata to determine when one or more of the artifacts should be migrated. The one or more of the artifacts are migrated from a first one of the storage tiers to a second one of the storage tiers using first and second ones of the storage providers configured to interface with the first and second ones of the storage tiers, respectively, when the determination indicates that the one or more of the artifacts should be migrated.

A non-transitory computer readable medium having stored thereon instructions for automated artifact storage management includes executable code which when executed by one or more processors, causes the processors to ingest a plurality of artifacts from one or more applications. The artifacts are stored on a plurality of storage tiers using a plurality of storage providers each configured to interface with one of the storage tiers. Metadata for each of the artifacts is generated and stored in a metadata store. The metadata includes at least a unique identifier for each of the artifacts associated with a storage location for each of the artifacts on the storage tiers. One or more configurable expressions of a storage policy are periodically and automatically applied to the metadata to determine when one or more of the artifacts should be migrated. The one or more of the artifacts are migrated from a first one of the storage tiers to a second one of the storage tiers using first and second ones of the storage providers configured to interface with the first and second ones of the storage tiers, respectively, when the determination indicates that the one or more of the artifacts should be migrated.

This technology has a number of associated advantages including providing methods, non-transitory computer readable media, and storage management devices that more effectively manage artifacts in enterprise data storage networks. In particular, this technology provides an application-agnostic platform to manage artifacts using pluggable storage provider implementations to interface with different types of storage tiers. The storage providers facilitate transparent management of artifact lifecycles and artifact migration to different storage tiers according to configurable and dynamic storage policies. The storage policies can be influenced and defined based on a pattern-based analysis of artifact migration and utilization to improve the efficiency of the storage platform. Accordingly, this technology results in reduced storage costs, reduced compliance violations, increased storage efficiency, and improved end user experience.

DETAILED DESCRIPTION

Figure 1:
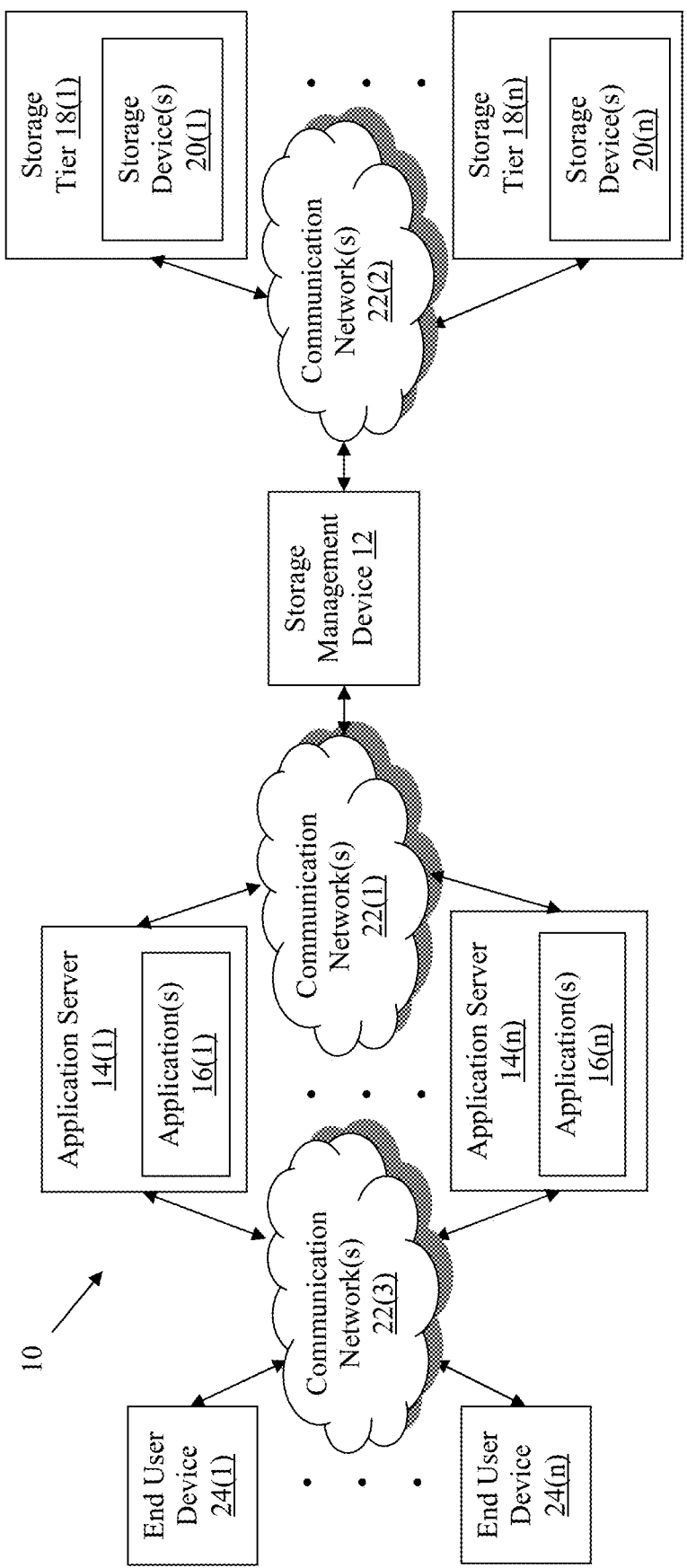
FIG. 1 is a block diagram of an exemplary network environment with an exemplary storage management device.

Referring to FIG. 1, an exemplary network environment 10 with an exemplary storage management device 12 is illustrated. The storage management device 12 in this example is coupled to a plurality of application servers 14(1)-14(n) hosting applications 16(1)-16(n) and storage tiers 18(1)-18(n) hosting storage devices 20(1)-20(n) via communication network(s) 22(1) and 22(2), respectively. In this example, the application servers 14(1)-14(n) are further coupled to a plurality of end user devices 24(1)-24(n) via communication network(s) 22(3), although the storage management device 12, application servers 14(1)-14(n), storage tiers 18(1)-18(n), or end user devices 24(1)-24(n), may be coupled together via other topologies. This technology provides a number of advantages including methods, non-transitory computer readable media, and storage management devices that more efficiently and effectively manage data storage networks to improve artifact lifecycle management, reduce storage overhead and cost, and improve end user experience.

Figure 2:
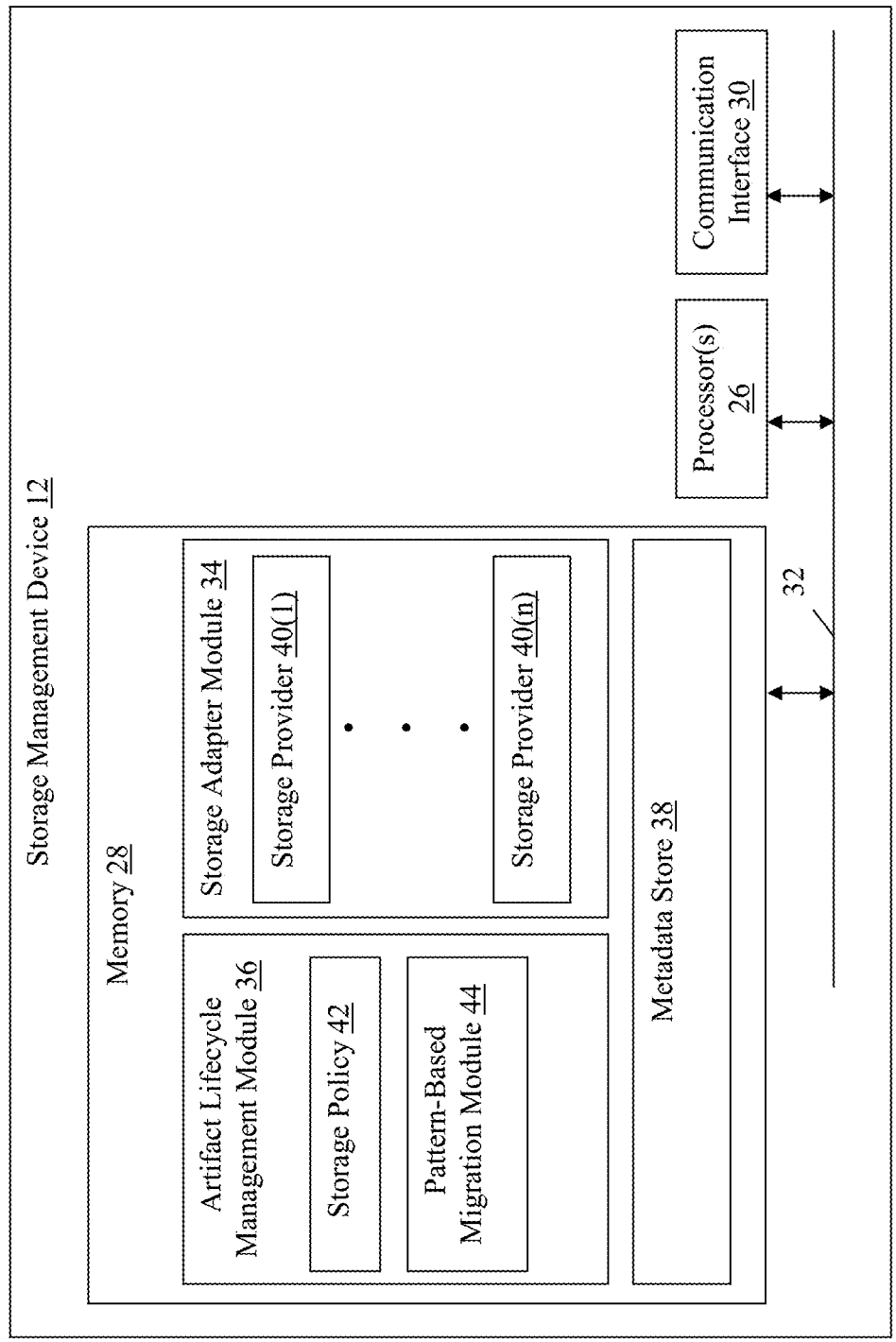
FIG. 2 is a block diagram of the exemplary storage management device of FIG. 1.

Referring to FIGS. 1-2, the storage management device 12 in this example includes one or more processors 26, a memory 28, and/or a communication interface 30, which are coupled together by a bus 32 or other communication link, although the storage management device 12 can include other types and/or numbers of elements in other configurations. The processor(s) 26 of the storage management device 12 may execute programmed instructions stored in the memory 28 for the any number of the functions described and illustrated herein. The processor(s) 26 may include one or more CPUs or processing cores, for example, although other types of processor(s) can also be used.

The memory 28 of the storage management device 12 stores these programmed instructions for one or more aspects of the present technology as described and illustrated herein, although some or all of the programmed instructions could be stored elsewhere. A variety of different types of storage devices, such as random access memory (RAM), read only memory (ROM), hard disk, solid state drives, flash memory, or other computer readable medium which is read from and written to by a magnetic, optical, or other reading and writing system that is coupled to the processor(s) 26, can be used for the memory 28.

Figure 3:
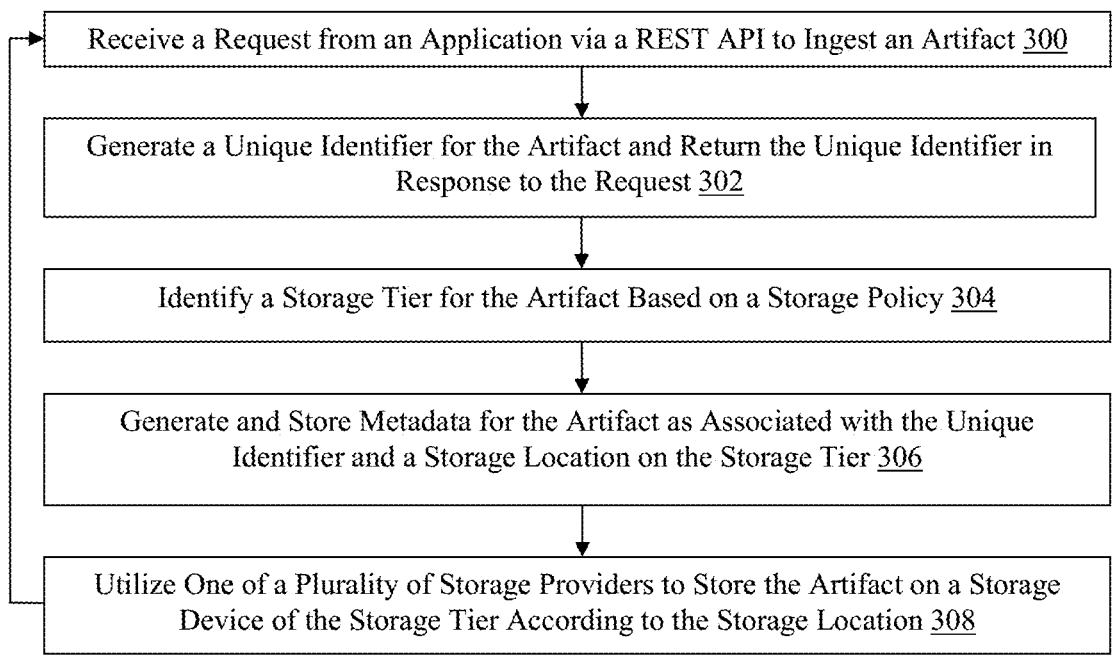
FIG. 3 is a flowchart of an exemplary method for ingesting artifacts.

Accordingly, the memory 28 of the storage management device 12 can store one or more applications that can include executable instructions that, when executed by the storage management device 12, cause the storage management device 12 to perform actions, such as to transmit, receive, or otherwise process network messages, store, retrieve, and move artifacts, for example, and to perform other actions described and illustrated below with reference to FIGS. 3-5. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the storage management device 12 itself, may be located in virtual server(s) running in a cloud-based computing environment rather than being tied to one or more specific physical network computing devices. Also, the application(s) may be running in one or more virtual machines (VMs) executing on the storage management device 12.

In this particular example, the memory 28 of the storage management device 12 includes a storage adapter module 34, an artifact lifecycle management module 36, and a metadata store 38, although the memory 28 can include other policies, modules, databases, or applications, for example. The storage adapter module 34 in this example includes a plurality of storage providers 40(1)-40(n), which are pluggable implementations of interfaces with the storage tiers 18(1)-18(n), although other types of policies and module can also be included in other examples.

One or more of the storage providers 40(1)-40(n) can be software, optionally leveraging the communication interface 30, hardware including input/output (I/O) or communication interface circuitry, or a combination thereof. The storage providers 40(1)-40(n) can interface with the storage devices 20(1)-20(n) over an I/O interconnect arrangement such as a conventional high-performance, Fibre Channel serial link topology, SAS, SCSI, or SATA, for example. In another example, the storage providers 40(1)-40(n) can interface with the storage devices 20(1)-20(n) via a cloud or other communication network, for example, and other types of arrangements can also be used in other examples. The storage provider(s) 40(1)-40(n) advantageously facilitate storage of artifacts on the storage tiers 18(1)-18(n) in a storage-agnostic manner from the perspective of the applications 16(1)-16(n), as described and illustrated in more detail later.

The artifact lifecycle management module 36 in this example includes at least one storage policy 42 and a pattern-based migration module 44, although other types of policies and module can also be included in other examples. The storage policy 42 includes configurable, dynamic expressions that can be applied to metadata associated with the artifacts to make determinations regarding artifact lifecycle management and migration. The configurable expressions can be established by an administrator and/or influenced by the pattern-based migration module 44. Exemplary expressions can require that artifacts in a particular one of the storage tiers 18(1)-18(n) that have not been accessed for a specified period of time, based on associated metadata, be migrated to a lower cost, higher latency one of the storage tiers 18(1)-18(n), for example, although other types of expressions, parameters, and migrations can be utilized with this technology.

The pattern-based migration module 44 is configured to analyze the utilization and movement of artifacts on the storage tiers 18(1)-18(n) to determine whether the storage policy 42 should be updated to reflect observed patterns in order to improve artifact storage management. Accordingly, the pattern-based migration module 44 can implement machine learning and other techniques to identify meaningful patterns in artifact movement and/or utilization in order to update the storage policy 42 and associated organization of artifacts on the storage tiers 18(1)-18(n).

In one example, the pattern-based migration module 44 can determine that artifacts associated with a particular one of the applications 16(1)-16(n), based on the corresponding metadata relating to access times, have a relatively low likelihood of being retrieved once a particular storage duration has elapsed. In this example, the pattern-based migration module 44 can modify the storage policy 42 to require that artifacts associated with the one of the applications 16(1)-16(n) having a storage duration greater than a particular threshold should be moved to a higher latency, lower cost one of the storage tiers 18(1)-18(n). Other types of patterns, parameters, and migrations can also be used in other examples.

The metadata store 38 in this example stores metadata relating to the artifacts managed by the storage management device 12. While the metadata store 38 is illustrated in FIG. 2 as hosted by the storage management device 12, the metadata store 38 can be hosted elsewhere in the network environment 10 in other examples. Additionally, one or more metadata stores can be utilized with this technology. The metadata store 38 in this example stores at least a unique identifier and a storage location on one or more of the storage device(s) 20(1)-20(n) of one of the storage tiers 18(1)-18(n) for each of the artifacts. Optionally, the metadata store 38 also stores a storage duration, usage data, an associated one of the applications 16(1)-16(n), a movement history, an access log, or other parameters or characteristics for one or more of the artifacts.

The communication interface 30 of the storage management device 12 operatively couples and communicates between the storage management device 12, the application servers 14(1)-14(n), and/or the storage tiers 18(1), which are all coupled together by the communication network(s) 22(1) and 22(2), although other types and/or numbers of communication networks or systems with other types and/or numbers of connections and/or configurations to other devices and/or elements can also be used.

By way of example only, the communication network(s) 22(1), 22(2), and/or 22(3) can include local area network(s) (LAN(s)) or wide area network(s) (WAN(s)), and can use TCP/IP over Ethernet and industry-standard protocols, although other types and/or numbers of protocols and/or communication networks can be used. The communication network(s) 22(1), 22(2), and/or 22(3) in this example can employ any suitable interface mechanisms and network communication technologies including, for example, Ethernet-based Packet Data Networks (PDNs) and the like.

The storage management device 12 can be a standalone device or integrated with one or more other devices or apparatuses. In one particular example, the storage management device 12 can include or be hosted by one of the application servers 14(1)-14(n) or storage tiers 18(1)-18(n), and other arrangements are also possible. Moreover, one or more of the devices of the storage management device 12 can be in a same or a different communication network including one or more public, private, or cloud networks, for example.

The end user devices 24(1)-24(n) in this example include any type of computing device that can interface with one or more of the application(s) 16(1)-16(n) hosted by the application servers 14(1)-14(n). Accordingly, the end user devices 24(1)-24(n) can be mobile computing devices, desktop computing devices, laptop computing devices, tablet computing devices, or the like. Each of the end user devices 24(1)-24(n) in this example include a processor, a memory, and a communication interface, which are coupled together by a bus or other communication link, although other numbers and/or types of network devices could be used.

The end user devices 24(1)-24(n) may run interface applications, such as standard web browsers or standalone client applications, which may provide an interface to communicate with one or more of the application(s) 16(1)-16(n) hosted by the application servers 14(1)-14(n) via the communication network(s) 18(3). The end user devices 24(1)-24(n) provide artifacts to the applications 16(1)-16(n), which are subsequently ingested by the storage management device 12 and stored on the storage tiers 18(1)-18(n), as described and illustrated in more detail later. In one particular example, the end user devices 24(1)-24(n) can provide check images as artifacts to a lockbox one of the applications 16(1)-16(n), although any other types of artifacts and applications can also be used in other examples. Each of the end user devices 24(1)-24(n) may further include a display device, such as a display screen or touchscreen, and/or an input device, such as a keyboard, for example.

Each of the application servers 14(1)-14(n) in this example includes one or more processors, a memory, and a communication interface, which are coupled together by a bus or other communication link, although other numbers and/or types of network devices could be used. The application servers 14(1)-14(n) process requests received from the end user devices 24(1)-24(n) via the communication network(s) 18(3) according to the HTTP-based application RFC protocol, for example. The requests received from the end user devices 24(1)-24(n) are directed to hosted applications 16(1)-16(n) and can include artifact(s) to be stored. The applications 16(1)-16(n) operating on the application servers 14(1)-14(n) may transmit data (e.g., web pages) to the end user devices 24(1)-24(n) in response to requests from the end user devices 24(1)-24(n), as well as send requests to the storage management device 12 via the communication network(s) 22(2) to store and retrieve artifacts, for example. The application servers 14(1)-14(n) may be hardware or software or may represent a system with multiple servers in a pool, which may include internal or external networks.

Although the application servers 14(1)-14(n) are illustrated as single devices, one or more actions of the application servers 14(1)-14(n) may be distributed across one or more distinct network computing devices that together comprise one or more the application servers 14(1)-14(n). Moreover, the application servers 14(1)-14(n) are not limited to a particular configuration. Thus, the application servers 14(1)-14(n) may contain a plurality of network computing devices that operate using a master/slave approach, whereby one of the network computing devices of one or more of the application servers 14(1)-14(n) operate to manage and/or otherwise coordinate operations of the other network computing devices. The application servers 14(1)-14(n) may operate as a plurality of network computing devices within a cluster architecture, a peer-to peer architecture, virtual machines, or within a cloud architecture, for example.

The storage tiers 18(1)-18(n) in this example generally provide services relating to the organization of artifacts on the storage devices 20(1)-20(n) on behalf of the application servers 14(1)-14(n). In this example, the storage tiers 18(1)-18(n) include storage device(s) 20(1)-20(n) each including a processor, a memory, storage adapter(s), and/or a communication interface, which are coupled together by a bus or other communication link.

One or more of the storage devices 20(1)-20(n) can be a storage server that includes hard disk drives, solid state drives, flash drives, optical disk-based storage, any combination thereof, or any other type of stable, non-volatile storage suitable for storing artifacts for short or long term retention, for example. One or more of the storage devices 20(1)-20(n) optionally host one or more volumes based on a Redundant Array of Inexpensive Disks (RAID) architecture or other topology facilitating data persistency, although other types and numbers of volumes in other topologies can also be used.

In this example, the storage tiers 18(1)-18(n) represent different types of solutions for artifact storage, such as storage area network (SAN) storage, simple storage service (S3) cloud-based storage, and/or custom or legacy enterprise storage, and other examples of storage solutions can also be used for the storage tiers 18(1)-18(n). The various storage tiers 18(1)-18(n) each have different associated protocols and characteristics including latency, redundancy, and/or cost, for example. Accordingly, the storage management device 12 can store ingested artifacts on the storage tiers 18(1)-18(n) at storage locations on the storage devices 20(1)-20(n), provide services relating to the artifacts such as retrieval and searching, and manage the lifecycle of the artifacts, including with respect to migration and removal of the artifacts, as described and illustrated in more detail later.

Although the exemplary network environment 10 with the storage management device 12, application servers 14(1)-14(n), storage tiers 18(1), end user devices 24(1)-24(n), and communication network(s) 18(1), 18(2), and 18(3) are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 10, such as the storage management device 12, application servers 14(1)-14(n), storage tiers 18(1), or end user devices 24(1)-24(n), for example, may be configured to operate as virtual instances on the same physical machine. In other words, one or more of the storage management device 12, application servers 14(1)-14(n), storage tiers 18(1), or end user devices 24(1)-24(n) may operate on the same physical device rather than as separate devices communicating through communication network(s) 18(1), 18(2), or 18(3). Additionally, there may be more or fewer storage management devices, application servers, storage tiers, or end user devices than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

An exemplary method of automated artifact storage management will now be described with reference to FIGS. 1-5. Referring more specifically to FIG. 3, a flowchart of an exemplary method for ingesting artifacts will now be described. In step 300 in this example, the storage management device 12 receives a request from one of the applications 16(1)-16(n) to ingest an artifact. The request can be received from a representational state transfer (REST) application programming interface (API), for example, although the request can be received in other ways. The artifact can be an image, document, or any other types of digital or electronic file or object.

In step 302, the storage management device 12 generates a unique identifier for the artifact and returns the unique identifier to the one of the applications 16(1)-16(n) in response to the request. Utilizing a unique identifier for artifacts allows the storage management device 12 to effectively abstract the storage locations so that the applications 16(1)-16(n) can subsequently retrieve artifacts using only the provided identifier for the artifacts, as described and illustrated in more detail later.

In step 304, the storage management device 12 identifies one of the storage tiers 18(1)-18(n) for the ingested artifact. The one of the storage tiers 18(1)-18(n) can be identified by applying the storage policy 42 to metadata associated with the artifact, such as the originating one of the applications 16(1)-16(n), artifacts size, artifact type, or any other characteristic or parameter associated with the artifact. The identified one of the storage tiers 18(1)-18(n) is an initial storage location or "tier one" storage for the artifact, and the artifact can be subsequently moved throughout its lifecycle in order to optimize the storage management of the artifact.

In one example, the artifact may be initially stored on a SAN on one of the storage tiers 18(1)-18(n) to facilitate low latency as the artifact may be more likely to be accessed relatively soon, although any other type of storage tier 18(1)-18(n) can be identified in step 304. Over time, the artifact may be migrated to an S3 one of the storage tiers 18(1)-18(n) as likelihood of access decreases and higher latency may be acceptable. Such migrations are facilitated as described and illustrated in more detail later with reference to FIG. 5.

In step 306, the storage management device 12 generates and stores metadata for the artifact in the metadata store 38. The metadata is stored as associated with the unique identifier generated in step 30 and a storage location on one of the storage devices 20(1)-20(n) of the one of the storage tiers 18(1)-18(n) identified in step 304. The metadata can include any characteristic or parameter associated with the artifact including the originating application, type, size, a timestamp corresponding to the ingest of the artifact, and/or a default value for a most recent access of the artifact or a number of times the artifact has been accessed, for example, although other types of metadata can also be used in other examples.

In step 308, the storage management device 12 utilizes one of the storage providers 40(1)-40(n) to store the artifact at the storage location on the one of the storage devices 20(1)-20(n) of the one of the storage tiers 18(1)-18(n) identified in step 304. The storage providers 40(1)-40(n) are configured to interface with respective ones of the storage tiers 18(1)-18(n) in order to facilitate artifact services, such as storage and retrieval. The storage providers 40(1)-40(n) are preconfigured in this example to utilize APIs and other communication interfaces of the storage tiers 18(1)-18(n) in order to abstract the storage locations and provide storage-agnostic storage of the artifacts for the application(s) 16(1)-16(n). Optionally, the artifact is encrypted when sent across the communication network(s) 22(2) by the one of the storage providers 40(1)-40(n).

Accordingly, the application(s) 16(1)-16(n) do not have to maintain any information regarding the storage location or particular one of the storage tiers 18(1)-18(n) for any of the artifacts in order to subsequently retrieve an artifact, nor do the application(s) 16(1)-16(n) have to be capable of interfacing directly with any of the storage tiers 18(1)-18(n). Facilitating artifact services based only on unique identifiers and abstracting the interface with the storage tiers 18(1)-18(n) from the perspective of the applications 16(1)-16(n) allows the storage management device 12 to relatively easily migrate artifacts and provide improved artifact storage management.

Figure 4:
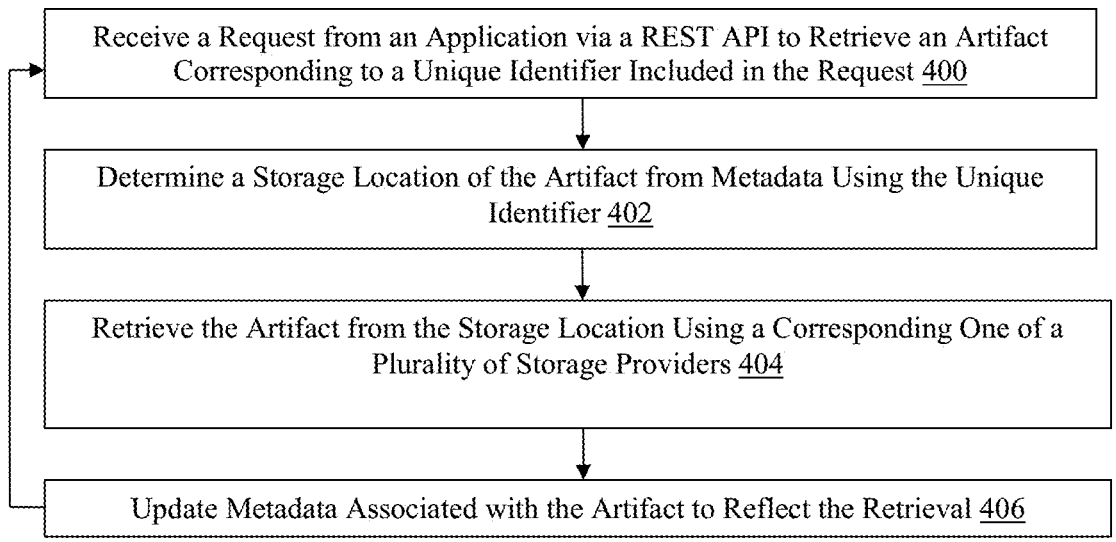
FIG. 4 is a flowchart of an exemplary method for retrieving artifacts.

Referring more specifically to FIG. 4, a flowchart of an exemplary method for retrieving artifacts will now be described. In step 400 in this example, the storage management device 12 receives a request from one of the applications 16(1)-16(n) to retrieve an artifact. The request can be received via a REST API provided by the storage management device 12 over the communication network(s) 22(3), for example. In this example, the request includes a unique identifier associated with an artifact. The unique identifier could have been provided to the one of the applications 16(1)-16(n) as described in step 302 of FIG. 3, for example.

In step 402, the storage management device 12 determines a storage location of the artifact from the metadata in the metadata store 38 using the unique identifier. Accordingly, the storage management device 12 can perform a lookup in the metadata store 38 using the unique identifier to retrieve the metadata associated with the artifact, and in particular the storage location on one of the storage devices 20(1)-20(n) of one of the storage tiers 18(1)-18(n).

In step 404, the storage management device 12 retrieves the artifact from the storage location on one of the storage devices 20(1)-20(n) of one of the storage tiers 18(1)-18(n). The retrieval is facilitated by one of the storage providers 40(1)-40(n) corresponding to the one of the storage tiers 18(1)-18(n) in this example.

In step 406, the storage management device 12 optionally updates the metadata associated with the artifact in the metadata store 38 to reflect the retrieval of the artifact by the one of the application(s) 16(1)-16(n). The updated metadata can indicate a timestamp of the retrieval, can result in incrementing a counter of a number of times that the artifact has been accessed, and/or can include an indication of the one of the application(s) 16(1)-16(n) from which the request to retrieve the artifact was received, for example, although other types of metadata can also be updated in step 406 in other examples. While retrieval of an artifact has been described and illustrated in step 400, other types of functionality can be facilitated by the storage management device 12 (e.g., artifact searching) in other examples.

Figure 5:
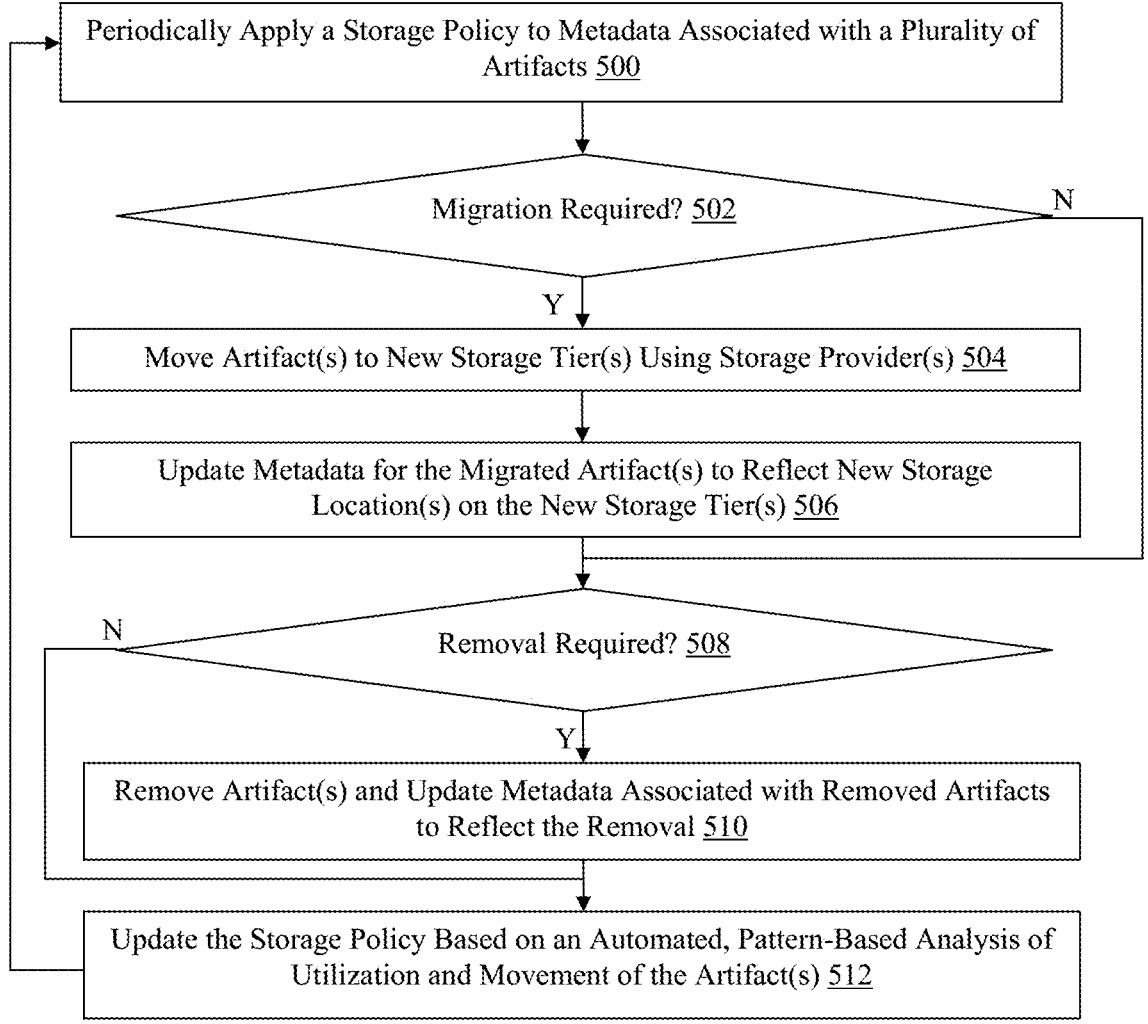
FIG. 5 is a flowchart of an exemplary method for managing artifact lifecycles.

Referring more specifically to FIG. 5, a flowchart of an exemplary method for managing artifact lifecycles will now be described. In step 500 in this example, the storage management device 12 periodically applies the storage policy 42 to metadata in the metadata store 38 associated with the artifacts. While the storage policy 42 is applied at configurable, periodic times in this example, the storage management device 12 also can apply the storage policy 42 continuously and other types of implementation can also be used. The storage policy 42 in this example includes dynamic configurable expression(s) that can be initially established by an administrator and/or the pattern-based migration module 44.

The configurable expression(s) are applied by the storage management device 12 to the metadata in the metadata store 38 to determine whether an artifact should be migrated to a different one of the storage tiers 18(1)-18(n). Accordingly, if the storage management device 12 determines in step 502 that one or more of the artifacts should be migrated based on the application of the storage policy 42, then the Yes branch is taken to step 504.

In step 504, the storage management device 12 moves the artifact(s) to new one(s) of the storage tiers 18(1)-18(n) using the storage provider(s) 40(1)-40(n). Accordingly, the migration is seamless from the perspective of the applications 16(1)-16(n) and can result in improved management and utilization of the storage platform. In particular, artifacts that are unlikely to be accessed can be moved to slower, lower cost one of the storage tiers 18(1)-18(n). Similarly, artifacts for which accesses have increased beyond a threshold number within a particular time period may be elevated to faster, higher cost storage tier(s) 18(1)-18(n), for example. Other types of migrations can also be performed in other examples.

In step 506, the storage management device 12 updates the metadata in the metadata store 38 for the moved artifact(s) to reflect new storage location(s) on the storage device(s) 20(1)-20(n) of the storage tier(s) 18(1)-18(n). Optionally, the metadata can also be updated in other ways for one or more of the artifact(s), such as to include a timestamp of the migration and/or an indication of the origin/prior one of the storage tiers 18(1)-18(n) for example. Subsequent to updating the metadata for the migrated artifact(s), or if the storage management device 12 determines in step 502 that no migrations are required for any of the artifacts and the No branch is taken, the storage management device 12 proceeds to step 508.

In step 508, the storage management device 12 determines whether removal of any of the artifacts is required based on the application of the storage policy 42. While a determination regarding removal is described and illustrated with reference to FIG. 5, the storage management device 12 can facilitate management of the artifacts throughout a lifecycle of the artifacts including with respect to relatively current utilization, archival, expiration, and removal, for example, and other events can be managed according to the storage policy 42 in other examples. Accordingly, if the storage management device 12 determines in step 508 that one or more of the artifacts required removal, then the Yes branch is taken to step 510.

In step 510, the storage management device 12 remove the artifact(s) and updates metadata in the metadata store 38 to reflect to the removal. The metadata can be updated by including a timestamp of the removal and maintaining the metadata associated with the removed artifact(s) (e.g., to facilitate pattern-based analysis) or by removing the metadata from the metadata store 38, and other types of updates can be performed in other examples. Subsequent to updating the metadata, or if the storage management device 12 determines in step 508 that removal is not required for any of the artifacts and the No branch is taken, the storage management device 12 proceeds to step 512.

In step 512, the storage management device 12 optionally updates the storage policy 42 based an automated, pattern-based analysis of utilization and movement of the artifact(s). In this example, the pattern-based migration module 44 analyzes the metadata in the metadata store 38 to determine whether any patterns have developed with sufficient confidence such that movement of one or more of the artifact(s) to different one(s) of the storage tier(s) 18(1)-18(n) would improve the utilization and organization of the storage platform.

In one example, the storage management device 12 may determine, based on analysis of access log metadata in the metadata store 38, that artifacts associated with a particular one of the application(s) 16(1)-16(n) are relatively unlikely to be accessed more than one week after being ingested. Accordingly, the pattern-based migration module 44 can dynamically and automatically update the storage policy 42 to include an expression requiring that artifacts associated with the particular one of the applications 16(1)-16(n) that have been stored for more than one week be moved to one of the storage tiers 18(1)-18(n) having relatively high latency and relatively low cost.

Other types of patterns and analysis of the metadata can also be used in other examples in order to dynamically update the storage policy 42 and facilitate automated migration and storage management. Additionally, one or more of steps 500-512 can be performed in a different order than the example illustrated in FIG. 5. As one example, step 512 can be performed separate from, and/or in parallel to, the periodic application of the storage policy 42 in other examples.

With this technology, artifact lifecycle management is advantageously optimized, resulting in improved storage platform utilization, reduced cost, and improved functionality of storage management devices through reduced overhead. This technology utilizes storage providers, unique artifact identifiers, and configurable, dynamic storage policies to abstract the artifact lifecycle management from the applications that leverage the storage platform. Additionally, this technology facilitates transparent, automated migration of artifacts across storage tiers of a storage platform based on preconfigured policy expressions, as well as a pattern-based metadata analysis, in order to reduce retention policy violations and improve storage efficiency.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for automated artifact storage management implemented by one or more storage management devices, the method comprising:
   ingesting, by a processor, a plurality of artifacts from one or more applications and storing the artifacts on a plurality of storage tiers using a plurality of storage providers each configured to interface with one of the storage tiers;
   generating, by the processor, for each artifact, a unique identifier that indicates a respective storage location of the corresponding artifact;
   determining a number of times one of the artifacts has been accessed;
   obtaining an ingest time of an ingest of the one of the artifacts;
   generating and storing, by the processor, in a metadata store
      at least the unique identifier for the one of the artifacts,
      a number of times the one of the artifacts has been accessed based on the determined number of times the one of the artifacts has been accessed, and
      an originating application of the one of the artifacts,
   the unique identifier, the number of times, and the originating application of the one of the artifacts being collectively denoted as metadata for the one of the artifacts;
   periodically and automatically applying, by the processor, one or more configurable expressions of a storage policy to the metadata to determine a circumstance for which one or more of the artifacts should be migrated;
   migrating, by the processor, the one or more of the artifacts from a first one of the storage tiers to a second one of the storage tiers using first and second ones of the storage providers configured to interface with the first and second ones of the storage tiers, respectively, based on a result of a determination of the circumstance; and
   automatically updating one or more of the configurable expressions of the storage policy based on at least one of utilization or movement of the artifacts according to a pattern-based analysis of the metadata for the artifacts, the pattern-based analysis being performed in order to determine that a particular artifact has a low likelihood of being retrieved after a threshold storage duration has elapsed, wherein the method further comprises:
   receiving a request from one of the applications to retrieve the one of the artifacts, the request comprising the unique identifier;
   identifying one of the storage locations on one of the storage tiers based on a lookup in the metadata store using the unique identifier;
   retrieving the one of the artifacts from the one of the storage locations;
   determining the number of times the one of the artifacts has been accessed;
   determining whether the number of times the one of the artifacts has been accessed is greater than a threshold number;
   elevating the one of the artifacts to a faster storage tier when the number of times the one of the artifacts has been accessed is greater than the threshold number; and
   updating the metadata corresponding to the one of the artifacts at least to include a first timestamp of the retrieval of the one of the artifacts.

2. The method as set forth in claim 1, further comprising determining a migration time at which the one of the artifacts is migrated from the first one of the storage tiers to the second one of the storage tiers,
generating a second timestamp of the migration, and
updating the metadata to include the second timestamp and updating the metadata for the one or more of the artifacts to at least replace one or more of the storage locations associated with the one or more of the artifacts with one or more new storage locations on the second one of the storage tiers, based on the result of the determination of the circumstance.

3. The method as set forth in claim 1, further comprising:
receiving requests, from the applications and via one or more representation state transfer (REST) application programming interfaces (APIs), to store the artifacts; and
returning one unique identifier in response to each of the requests.

4. The method as set forth in claim 1, further comprising:
further determining whether one of the artifacts should be removed based on application of the configurable expressions to the metadata for the one of the artifacts, and based on a result of the further determination:
removing the one of the artifacts from one of the storage locations associated with the unique identifier for the one of the artifacts in the metadata store;
determining a time of removal of the one of the artifacts;
generating a second timestamp of the time of removal of the one of the artifacts; and
updating the metadata store to reflect removal of the one of the artifacts.

5. A storage management device, comprising:
a memory including programmed instructions stored thereon; and one or more processors configured to be capable of executing the programmed instructions to:

ingest a plurality of artifacts from one or more applications and store the artifacts on a plurality of storage tiers using a plurality of storage providers each configured to interface with one of the storage tiers;

generate, for each artifact, a unique identifier that indicates a respective storage location of the corresponding artifact;

determine a number of times one of the artifacts has been accessed;

obtain an ingest time of an ingest of the one of the artifacts;

generate and store in a metadata store
at least the unique identifier for the one of the artifacts,
a number of times the one of the artifacts has been accessed based on the determined number of times the one of the artifacts has been accessed, and
an originating application of the one of the artifacts,
the unique identifier, the number of times, and the originating application for the one of the artifacts being collectively denoted as metadata for the one of the artifacts;

periodically and automatically apply one or more configurable expressions of a storage policy to the metadata to determine a circumstance for which one or more of the artifacts should be migrated;

migrate the one or more of the artifacts from a first one of the storage tiers to a second one of the storage tiers using first and second ones of the storage providers configured to interface with the first and second ones of the storage tiers, respectively, based on a result of a determination of the circumstance; and automatically update one or more of the configurable expressions of the storage policy based on at least one of utilization or movement of the artifacts according to a pattern-based analysis of the metadata for the artifacts, the pattern-based analysis being performed in order to determine that a particular artifact has a low likelihood of being retrieved after a threshold storage duration has elapsed, wherein the one or more processors are also configured to execute the programmed instructions to:

receive a request from one of the applications to retrieve the one of the artifacts, the request comprising the unique identifier;

identify one of the storage locations on one of the storage tiers based on a lookup in the metadata store using the unique identifier;

retrieve the one of the artifacts from the one of the storage locations;

determine the number of times the one of the artifacts has been accessed;

determine whether the number of times the one of the artifacts has been accessed is greater than a threshold number;

elevate the one of the artifacts to a faster storage tier when the number of times the one of the artifacts has been accessed is greater than the threshold number; and update the metadata corresponding to the one of the artifacts at least to include a first timestamp of the retrieval of the one of the artifacts.

6. The storage management device as set forth in claim 5, wherein the one or more processors are further configured to be capable of executing the programmed instructions to determine a migration time at which the one of the artifacts is migrated from the first one of the storage tiers to the second one of the storage tiers, generate a second timestamp of the migration, and update the metadata to include the second timestamp and update the metadata for the one or more of the artifacts to at least replace one or more of the storage locations associated with the one or more of the artifacts with one or more new storage locations on the second one of the storage tiers, based on the result of the determination of the circumstance.

7. The storage management device as set forth in claim 5, wherein the one or more processors are further configured to be capable of executing the stored programmed instructions to:

receive requests, from the applications and via one or more representation state transfer (REST) application programming interfaces (APIs), to store the artifacts; and return one unique identifier in response to each of the requests.

8. The storage management device as set forth in claim 5, wherein the one or more processors are further configured to be capable of executing the stored programmed instructions to:

further determine whether one of the artifacts should be removed based on application of the configurable expressions to the metadata for the one of the artifacts, and based on a result of the further determination;

remove the one of the artifacts from one of the storage locations associated with the unique identifier for the one of the artifacts in the metadata store;

determine a time of removal of the one of the artifacts;

generate a second timestamp of the time of removal of the one of the artifacts; and update the metadata store to reflect removal of the one of the artifacts.

9. A non-transitory machine readable medium having stored thereon instructions for automated artifact storage management, the instructions comprising executable code which, when executed by one or more processors, causes the one or more processors to:

ingest a plurality of artifacts from one or more applications and store the artifacts on a plurality of storage tiers using a plurality of storage providers each configured to interface with one of the storage tiers;

generate, for each artifact, a unique identifier that indicates a respective storage location of the corresponding artifact;

determine a number of times one of the artifacts has been accessed;

obtain an ingest time of an ingest of the one of the artifacts;

generate and store in a metadata store
at least the unique identifier for the one of the artifacts,
a number of times the one of the artifacts has been accessed based on the determined number of times the one of the artifacts has been accessed, and
an originating application of the one of the artifacts,
the unique identifier, the number of times, and the originating application for the one of the artifacts being collectively denoted as metadata for the one of the artifacts;

periodically and automatically apply one or more configurable expressions of a storage policy to the metadata to determine a circumstance for which one or more of the artifacts should be migrated;

migrate the one or more of the artifacts from a first one of the storage tiers to a second one of the storage tiers using first and second ones of the storage providers configured to interface with the first and second ones of the storage tiers, respectively, based on a result of a determination of the circumstance; and automatically update one or more of the configurable expressions of the storage policy based on at least one of utilization or movement of the artifacts according to a pattern-based analysis of the metadata for the artifacts, the pattern-based analysis being performed in order to determine that a particular artifact has a low likelihood of being retrieved after a threshold storage duration has elapsed, wherein the executable code, when executed by the one or more processors, further causes the one or more processors to:

receive a request from one of the applications to retrieve the one of the artifacts, the request comprising the unique identifier;

identify one of the storage locations on one of the storage tiers based on a lookup in the metadata store using the unique identifier;

retrieve the one of the artifacts from the one of the storage locations;

determine the number of times the one of the artifacts has been accessed;

determine whether the number of times the one of the artifacts has been accessed is greater than a threshold number;

elevate the one of the artifacts to a faster storage tier when the number of times the one of the artifacts has been accessed is greater than the threshold number; and update the metadata corresponding to the one of the artifacts at least to include a first timestamp of the retrieval of the one of the artifacts.

10. The non-transitory machine readable medium as set forth in claim 9, wherein the executable code, when executed by the one or more processors, further causes the one or more processors to determine a migration time at which the one of the artifacts is migrated from the first one of the storage tiers to the second one of the storage tiers, generate a second timestamp of the migration, and update the metadata to include the second timestamp and update the metadata for the one or more of the artifacts to at least replace one or more of the storage locations associated with the one or more of the artifacts with one or more new storage locations on the second one of the storage tiers, based on the result of the determination of the circumstance.

11. The non-transitory machine readable medium as set forth in claim 9, wherein the executable code, when executed by the one or more processors, further causes the one or more processors to:

receive requests, from the applications and via one or more representation state transfer (REST) application programming interfaces (APIs), to store the artifacts; and return one unique identifier in response to each of the requests.

12. The non-transitory machine readable medium as set forth in claim 9, wherein the executable code, when executed by the one or more processors, further causes the one or more processors to:

further determine whether one of the artifacts should be removed based on application of the configurable expressions to the metadata for the one of the artifacts, and based on a result of the further determination:

remove the one of the artifacts from one of the storage locations associated with the unique identifier for the one of the artifacts in the metadata store;

determine a time of removal of the one of the artifacts;

generate a second timestamp of the time of removal of the one of the artifacts; and update the metadata store to reflect the removal of the one of the artifacts.

* * * * *